United States Patent Office 3,022,345
Patented Feb. 20, 1962

3,022,345
OXALIC ACID HYDRAZIDES
Jacob Szmuszkovicz, Portage Township, Kalamazoo County, Mich., assignor to The Upjohn Company, Kalamazoo, Mich., a corporation of Delaware
No Drawing. Filed Sept. 12, 1960, Ser. No. 55,178
6 Claims. (Cl. 260—561)

This invention relates to novel compounds, and to a process for preparing them. More particularly, the invention is directed to oxalic acid 2-(hydroxyalkyl)hydrazides, and to a process for preparing them.

The oxalic acid 2-(hydroxyalkyl)hydrazides of this invention have the following structural formula

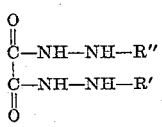
I wherein R' is hydroxyalkyl of from 2 to 6 carbon atoms, inclusive, and R'' is selected from the group consisting of alkyl of from 1 to 6 carbon atoms, inclusive, and hydroxyalkyl of from 2 to 6 carbon atoms, inclusive.

The novel oxalic acid 2-(hydroxyalkyl)hydrazides of this invention are monoamine oxidase inhibitors and are useful for inhibiting this enzyme in animals and in laboratory processes. Thus, for example, the compounds of the invention are useful in research for selective inhibition of monoamine oxidase in mixed enzyme systems. They can also be used in the characterization and quantitative determination of monoamine oxidase activity in the laboratory. They are also useful in the treatment of mental disease, such as mental depression, where psychic energization is desired.

When used in therapy, especially in mammals, the novel compounds of the invention can be combined and formulated in the form of tablets, powder packets, or capsules, using starch and like excipients. The compounds can also be dissolved or suspended in suitable solvents or vehicles, for oral or parenteral administration.

In accordance with the invention and structural Formula I, the novel oxalic acid 2-(hydroxyalkyl)hydrazides of this invention have at least one hydroxyalkyl-substituted hydrazido group. The other hydrazido group may be substituted with the same or a different hydroxyalkyl group or it may be alkyl-substituted.

Representative hydroxyalkyl groups include, for example, 2-hydroxyethyl, 3-hydroxypropyl, 4-hydroxybutyl, 5-hydroxypentyl, 6-hydroxyhexyl, 1-methyl-2-hydroxyethyl, 2-hydroxypropyl, 1-methyl-2-hydroxypropyl, 2-hydroxy-1-(hydroxymethyl)ethyl, 2,3-dihydroxypropyl, 2-hydroxybutyl, 2-methyl-2-hydroxybutyl, 1-methyl-3-hydroxybutyl, and 1-methyl-4-hydroxypentyl. Representative alkyl groups within the purview of this invention include, for example, methyl, ethyl, propyl, butyl, pentyl, hexyl, and isomeric forms thereof.

Oxalic acid bis[2-(hydroxyalkyl)hydrazide] is conveniently prepared by reacting oxalic acid dihydrazide with hydroxyalkanone, for example, hydroxyacetone, dihydroxyacetone, 2-hydroxy-3-butanone, and 4-hydroxy-2-hexanone, with dioxalkane, for example, diacetyl, acetylacetone, 1-acetyl-2-butanone, glyoxal, and pyruvaldehyde, or with hydroxyalkanal, for example, hydroxyacetaldehyde, 3-hydroxypropionaldehyde (hydracrylicaldehyde), and 4-hydroxycaproaldehyde, to obtain oxalic acid bis(alkylidenehydrazide) which is then hydrogenated to give oxalic acid bis[2-(hydroxyalkyl)hydrazide]. The process is depicted by the following equations:

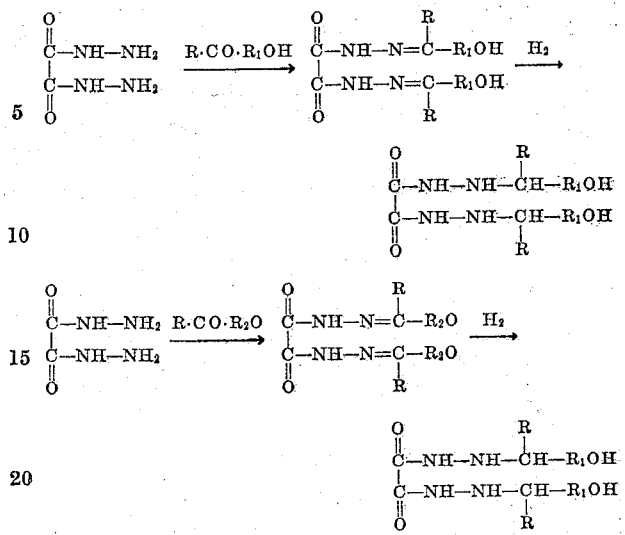

wherein R is hydrogen, alkyl, or hydroxyalkyl, $R_1OH$ is hydroxyalkyl, $R_2O$ is oxalkyl, and wherein $R+R_1$ or $R+R_2$ total 1 to 5 carbon atoms, inclusive.

The oxalic acid dihydrazide and the hydroxyalkanone, dioxalkane, or hydroxyalkanal are mixed and heated in the presence of an inert organic solvent, for example, ethanol, methanol, and propanol, until the formation of the oxalic acid bis(alkylidenehydrazide) is substantially completed. The reaction, stoichiometrically, requires 2 moles of hydroxyalkanone, dioxalkane, or hydroxyalkanal for each mole of oxalic acid dihydrazide; if desired, an excess (up to about 4 moles) can be used in order to assure completeness of reaction. The oxalic acid bis(alkylidenehydrazide) separates as a solid and can be recovered from the reaction mixture and purified by conventional procedures, for example, filtration, washing, and recrystallization.

Hydrogenation of the oxalic acid bis(alkylidenehydrazide) can be effected by any of the commonly known methods for saturating carbon-to-nitrogen and carbon-to-oxygen double bonds. Advantageously, hydrogenation of the oxalic acid bis (alkylidenehydrazides) is accomplished with hydrogen in the presence of platinum catalyst, for example, platinum oxide. The hydrogenation is carried out in an inert organic solvent, for example, dioxane, methanol, ethanol, isopropanol, and the like. Hydrogen pressures ranging from about atmospheric pressure to about 70 lbs. per square inch, and temperature conditions ranging from about 10° C. to about 75° C. can be employed; pressures up to about 50 lbs. and reaction temperatures of from about 20° C. to about 50° C. ordinarily being very convenient. After hydrogenation the oxalic acid bis[2-(hydroxyalkyl) hydrazide] is recovered by conventional procedures; for example, removing the solvent, trituration and washing, and recrystallization.

Alternatively, oxalic acid bis[2-(hydroxyalkyl)hydrazide] is prepared by reacting dialkyl oxalate, for example, dimethyl oxalate, diethyl oxalate, dipropyl oxalate, and dibutyl oxalate, with (hydroxyalkyl)hydrazine, for example, (2-hydroxyethyl)hydrazine, (3-hydroxypropyl)-hydrazine, (2-hydroxypropyl)hydrazine, (2-hydroxy-1-methylethyl)hydrazine, (2,3-dihydroxypropyl)hydrazine, (4-hydroxybutyl)hydrazine, (2 - hydroxybutyl)hydrazine, (2-hydroxy-1-methylpropyl)hydrazine, (2 - hydroxy - 2-methylbutyl)hydrazine, (2-hydroxyhexyl)hydrazine, and [1 - (hydroxymethyl)pentyl]hydrazine. (Hydroxyalkyl)-hydrazines, many of which are known, can be prepared by processes such as those disclosed by Gever, Jour. Am.

Chem. Soc. 76, 1283, 1954; Benoit, Bull. soc. chim. 6, 708, 1939; and Freudenberg and Hess, Ann. 448, 121, 1926. This method of obtaining the novel oxalic acid bis[2-hydroxyalkyl)hydrazides] of the invention is depicted by the following equation:

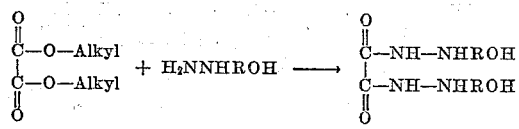

wherein ROH is hydroxyalkyl of from 2 to 6 carbon atoms, inclusive.

The reaction is carried out in an inert organic solvent, for example, methanol, ethanol, and propanol. At least 2 moles of the (hydroxyalkyl)hydrazine, or an excess, is used for each mole of dialkyl oxalate; advantageously, the reaction mixture is heated for a time sufficient to ensure completeness of reaction. The oxalic acid bis[2-(hydroxyalkyl)hydrazide] is recovered by conventional methods.

Oxalic acid 2-(hydroxyalkyl)hydrazide 2-alkylhydrazide can be prepared by reacting dialkyl oxalate with hydrazine to obtain the corresponding monoalkyl oxalate hydrazide and then reacting the latter with alkanone, for example, acetone, 2-butanone, and 3-hexanone, or with alkanal, for example, acetaldehyde, propionaldehyde, trimethylacetaldehyde, and caproaldehyde and then hydrogenating the resulting monoalkyl oxalate alkylidenehydrazide to obtain monoalkyl oxalate 2-alkylhydrazide. The monoalkyl oxalate 2-alkylhydrazide is then reacted with hydrazine to obtain oxalic acid hydrazide 2-alkylhydrazide which in turn is reacted with hydroxyalkanone, dioxalkane, or with hydroxyalkanal, and the resulting oxalic acid alkylidenehydrazide 2-alkylhydrazide is hydrogenated to give oxalic acid 2-(hydroxyalkyl)hydrazide 2-alkylhydrazide. The foregoing sequence of reaction steps is exemplified as follows:

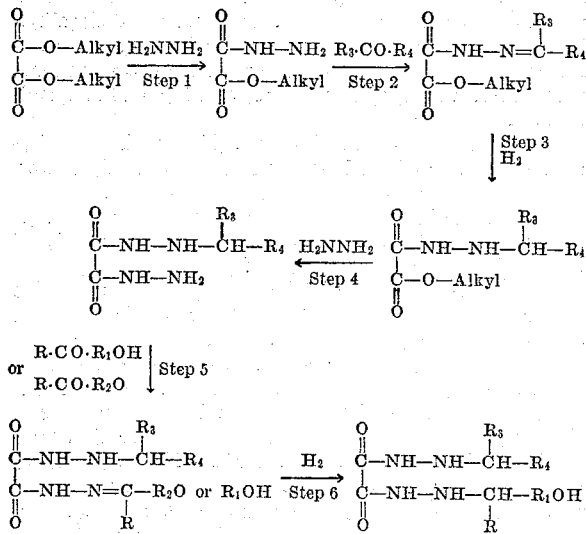

wherein $R_3$ is hydrogen or alkyl; $R_4$ is alkyl; R is hydrogen, alkyl, or hydroxyalkyl; $R_1OH$ is hydroxyalkyl; $R_2O$ is oxalkyl, and wherein $R+R_1$, $R+R_2$, or $R_3+R_4$ total 1 to 5 carbon atoms, inclusive. Oxalic acid 2-(hydroxyalkyl)hydrazide 2-alkylhydrazide can also be prepared by interchanging the carbonylic reactants of Steps 2 and 5 above, i.e., by employing reactant $R \cdot CO \cdot R_1OH$ or $R \cdot CO \cdot R_2O$ in Step 2 and $R_3 \cdot CO \cdot R_4$ in Step 5.

Alternatively, oxalic acid 2-(hydroxyalkyl)hydrazide 2-alkylhydrazide can be prepared by first reacting dialkyl oxalate with alkylhydrazine, for example, methyl-, ethyl-, propyl-, isopentyl-, and hexylhydrazine, to produce monoalkyl oxalate 2-alkylhydrazide, and then reacting the monoalkyl oxalate 2-alkylhydrazide with (hydroxyalkyl)- hydrazine, for example, 2-hydroxyethyl-, 3-hydroxypropyl-, 2-hydroxybutyl-, and (6-hydroxyhexyl)hydrazine, to produce the desired oxalic acid 2-(hydroxyalkyl)hydrazide 2-alkylhydrazide. The reaction steps are represented as follows:

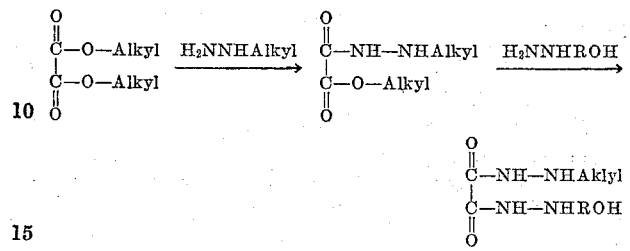

wherein ROH is hydroxyalkyl of from 2 to 6 carbon atoms, inclusive. Similarly, oxalic acid 2-(hydroxyalkyl)-hydrazide 2-alkylhydrazide can be prepared by employing (hydroxyalkyl)hydrazine in the first step of the process, and alkylhydrazine in the second step. By employing one (hydroxyalkyl)hydrazine in the first step of the process and a different (hydroxyalkyl)hydrazine in the second step, there is obtained unsymmetrical oxalic acid bis[2-(hydroxyalkyl)hydrazide], i.e., a compound having different hydroxyalkyl groups.

The following examples are illustrative of the process and products of the present invention, but are not to be construed as limiting.

EXAMPLE 1

*Preparation of oxalic acid bis[2-(2-hydroxy-1-methylpropyl)hydrazide]*

A. OXALIC ACID BIS[(2-OXO-1-METHYLPROPYLIDENE)HYDRAZIDE]

A mixture of oxalic acid dihydrazide (23.6 g., 0.2 mole), diacetyl (68.8 g., 0.8 mole), and 800 ml. of ethanol was stirred and refluxed for 4.75 hr., and then was cooled and filtered. The solid product thus obtained was washed with ethanol and then with ether. The washed solid was recrystallized from ethanol, the ethanolic solution being filtered while hot in order to remove insoluble material. There was thus obtained 29.6 g. of oxalic acid bis[(2-oxo-1-methylpropylidene)hydrazide], M.P. 219–220° C.

*Analysis.*—Calcd. for $C_{10}H_{14}N_4O_4$: C, 47.24; H, 5.55; N, 22.04. Found: C, 47.42; H, 5.66; N, 21.56.

B. OXALIC ACID BIS[2-(2-HYDROXY-1-METHYLPROPYL)HYDRAZIDE]

Platinum oxide catalyst (0.5 g.) was added to a suspension of 12.7 g. (0.05 mole) of oxalic acid bis[(2-oxo-1-methylpropylidene)hydrazide] in 300 ml. of ethanol. The mixture was subjected to catalytic hydrogenation at 50° C. and 50 lbs. hydrogen pressure for 3 hr., at which time 4 molar equivalents of hydrogen had been absorbed. The mixture was filtered, the filtrate was evaporated to dryness, and the residue was recrystallized from 50 ml. of acetone. There was thus obtained 4.0 g. of oxalic acid bis[2-(2-hydroxy-1-methylpropyl)hydrazide], M.P. 147–149° C. After two more recrystallizations from acetone, the compound melted at 154.5–156.5° C.

*Analysis.*—Calcd. for $C_{10}H_{22}N_4O_4$: C, 45.79; H, 8.45; N, 21.36. Found: C, 45.93; H, 8.75; N, 21.73.

EXAMPLE 2

*Preparation of oxalic acid bis{2-[2-hydroxy-1-(hydroxymethyl)ethyl]hydrazide}*

A. OXALIC ACID BIS{[2-HYDROXY-1-(HYDROXYMETHYL)ETHYLIDENE]HYDRAZIDE}

Commercial dihydroxyacetone(1,3-dihydroxy-2-propanone) was distilled from an oil-jacketed flask at 150° C. and pressure of 0.1 mm. of mercury. The distillate solidified and was melted before dissolving it in ethanol for use in the following reaction.

A mixture of oxalic acid dihydrazide (11.8 g., 0.1 mole), distilled dihydroxyacetone (36.4 g., 0.4 mole), and 800 ml. of ethanol was stirred and refluxed under a nitrogen atmosphere for 2.25 hr. The mixture, after standing overnight at about 25° C., was filtered in order to recover the solid product contained therein. The solid was washed successively with ethanol and ether, and was then recrystallized from a mixture of dimethylformamide (250 ml.) and ethanol (500 ml.). There was thus obtained 10.6 g. of oxalic acid bis{[2-hydroxy-1-(hydroxymethyl)ethylidene]hydrazide}, M.P. 170° C. (decomp.). A second crop weighing 5.7 g. was obtained from the mother liquor.

Analysis.—Calcd. for $C_8H_{14}N_4O_6$: C, 36.64; H, 5.38; N, 21.37. Found: C, 37.09; H, 5.59; N, 21.64.

B. OXALIC ACID BIS{2-[2-HYDROXY-1-(HYDROXYMETHYL)ETHYL]HYDRAZIDE}

Platinum oxide catalyst (0.6 g.) was added to a suspension of 13.53 g. (0.0515 mole) of oxalic acid bis{[2-hydroxy-1-(hydroxymethyl)ethylidene]hydrazide} in 300 ml. of ethanol. The mixture was subjected to catalytic hydrogenation at 50° C. and 50 lb. hydrogen pressure for 2 hr., at which time 2 molar equivalents of hydrogen had been absorbed. The mixture was filtered and the filtrate was evaporated to dryness. The residue was recrystallized from a mixture of dimethylformamide (50 ml.) and ethanol (200 ml.). There was thus obtained 11.0 g. of oxalic acid bis {2-[2-hydroxy-1-(hydroxymethyl)ethyl]hydrazide}, M.P. 175.5–176.5° C.

Anal.—Calcd. for $C_8H_{18}N_4O_6$: C, 36.09; H, 6.81; N, 21.04. Found: C, 36.33; H, 7.02; N, 21.25.

EXAMPLE 3

*Preparation of oxalic acid bis [2-(2-hydroxy-1-methylethyl)hydrazide]*

Following the procedure of Example 2, Part A, but substituting hydroxyacetone (acetol) for dihydroxyacetone, oxalic acid bis[(2-hydroxy-1-methylethylidene)hydrazide] is obtained. The latter compound is then reduced according to the procedure of Part B to obtain oxalic acid bis[2-(2-hydroxy-1-methylethyl)hydrazide].

EXAMPLE 4

*Preparation of oxalic acid bis[2-(3-hydroxy-1-methylbutyl)hydrazide]*

Following the procedure of Example 1, Part A, but substituting acetylacetone for diacetyl, oxalic acid bis[(3-oxo-1-methylbutylidene)hydrazide] is obtained. The latter compound is then reduced according to the procedure of Part B to obtain oxalic acid bis[2-(3-hydroxy-1-methylbutyl) hydrazide].

EXAMPLE 5

*Preparation of oxalic acid 2-[2-hydroxy-1-(hydroxymethyl)ethyl]hydrazide 2-isopropylhydrazide*

A. MONOETHYL OXALATE HYDRAZIDE

A solution of hydrazine hydrate (15 g., 0.3 mole) in 25 ml. of ethanol was added during 15 min. to a stirred solution of diethyl oxalate (75 g., 0.515 mole) in 25 ml. of ethanol, the mixture being maintained between −15° and −20° C. The resulting suspension was stirred for 10 min. more at the same temperature and then for 1.25 hr. at about 25° C. The mixture was filtered and the filtrate was evaporated under reduced pressure at 30° to 35° C. The residue was cooled, water (75 ml.) was added, and the solution was extracted with ether. The ether extract was discarded. The aqueous solution was warmed to 35° C. to remove residual ether. There was thus obtained an aqueous solution of monoethyl oxalate hydrazide.

B. MONOETHYL OXALATE ISOPROPYLIDENEHYDRAZIDE

To the above aqueous solution of monoethyl oxalate hydrazide was added 44 ml. of acetone. The resulting solution, after standing for 1 hr. at 25° C., was evaporated overnight under reduced pressure at 25–30° C. and was then freeze-dried. The residual oily solid was dissolved in 250 ml. of acetone. The solution was refluxed for 2 hr. and was then evaporated under reduced pressure at 30° C. There was thus obtained 37.7 g. of monoethyl oxalate isopropylidenehydrazide as a solid residue.

C. MONOETHYL OXALATE 2-ISOPROPYLHYDRAZIDE

Platinum oxide catalyst (1.0 g.) was added to a solution of monoethyl oxalate isopropylidenehydrazide (37.0 g., 0.215 mole) in 200 ml. of ethanol. The mixture was subjected to catalytic hydrogenation at 50° C. and 52 lb. hydrogen pressure until about two-thirds the theoretical amount of hydrogen had been absorbed. An additional 1.0 g. of catalyst was added and hydrogenation was continued until absorption of hydrogen was complete. The mixture was filtered and the filtrate was evaporated to dryness under reduced pressure at 40° C. There was thus obtained 36.0 g. of oily monoethyl oxalate 2-isopropylhydrazide.

D. OXALIC ACID HYDRAZIDE 2-ISOPROPYLHYDRAZIDE

A solution of monoethyl oxalate 2-isopropylhydrazide (36.0 g., 0.206 mole) in 50 ml. of ethanol was added during 10 min. to a stirred solution of hydrazine hydrate (12.7 g., 0.227 mole) in 100 ml. of ethanol. The resulting suspension was stirred for 1 hr. and filtered. The filter cake, after washing with ethanol and drying, weighed 28.0 g. The dry cake was added to 2250 ml. of ethanol; this mixture was refluxed and then filtered while hot in order to remove insoluble material. The solid which separated from the filtrate when the latter was cooled to about 20° C. was recovered by filtration and dried. There was thus obtained 17.5 g. of oxalic acid hydrazide 2-isopropylhydrazide, M.P. 178–181.5° C. A second crop weighing 2.9 g. was obtained from the mother liquor. An analytical sample was prepared by recrystallization from ethanol; M.P. 180.5–182° C.

Anal.—Calcd. for $C_5H_{12}N_4O_2$: C, 37.49; H, 7.55; N, 34.98. Found: C, 37.57; H, 7.73; N, 35.35.

E. OXALIC ACID 2-[2-HYDROXY-1-(HYDROXYMETHYL)ETHYL]HYDRAZIDE 2-ISOPROPYLHYDRAZIDE

A solution of freshly distilled dihydroxyacetone (5.4 g., 0.06 mole) in 20 ml. of ethanol was added to a suspension of oxalic acid hydrazide 2-isopropylhydrazide (4.8 g., 0.03 mole) in 350 ml. of ethanol. The mixture was refluxed under a nitrogen atmosphere for 70 min. The resulting solution was concentrated to 100 ml. and 0.5 g. of platinum oxide catalyst was added. The mixture was subjected to catalytic hydrogenation at 50° C. and 54 lb. hydrogen pressure until the theoretical amount of hydrogen had been absorbed, and then was filtered. The filtrate was cooled to about 0° C. and crystallization occurred. The crystalline product was recovered by filtration, dried, and recrystallized from ethanol. There was thus obtained oxalic acid 2-[2-hydroxy-1-(hydroxymethyl)ethyl]hydrazide 2 - isopropylhydrazide, M.P. 145–148° C.

Anal.—Calcd. for $C_8H_{18}N_4O_4$: C, 41.01; H, 7.75; N, 23.92. Found: C, 40.74; H, 7.98; N, 24.27.

EXAMPLE 6

*Preparation of oxalic acid 2-[2-hydroxy-1-(hydroxymethyl)ethyl]hydrazide 2-hexylhydrazide*

Following the procedure of Example 5, but substituting caproaldehyde for acetone in Part B, there is obtained monoethyl oxalate hexylidenehydrazide, which is reduced according to the procedure of Part C to obtain monoethyl oxalate 2-hexylhydrazide, which is then substituted for monoethyl oxalate 2-isopropylhydrazide in the procedure of Part D to obtain oxalic acid hydrazide 2-hexylhydrazide. The latter compound is then substituted for oxalic acid hydrazide 2-isopropylhydrazide in the procedure of Part E to obtain oxalic acid 2-[2-hydroxy-1-(hydroxymethyl)ethyl]hydrazide 2-hexylhydrazide.

EXAMPLE 7

*Preparation of oxalic acid 2-(3-hydroxypropyl) hydrazide 2-neopentylhydrazide*

Following the procedure of Example 5, but substituting trimethylacetaldehyde for acetone in Part B, there is obtained monoethyl oxalate neopentylidenehydrazide, which is reduced according to the procedure of Part C to obtain monoethyl oxalate 2-neopentylhydrazide, which is then substituted for monoethyl oxalate 2-isopropylhydrazide in the procedure of Part D to obtain oxalic acid hydrazide 2-neopentylhydrazide. The latter compound is then substituted for oxalic acid hydrazide 2-isopropylhydrazide and hydracrylaldehyde is substituted for dihydroxyacetone in the procedure of Part E to obtain oxalic acid 2-(3-hydroxypropyl)hydrazide 2-neopentylhydrazide.

EXAMPLE 8

*Preparation of oxalic acid bis[2-(2-hydroxyethyl)-hydrazide]*

Diethyl oxalate (0.1 mole) is gradually added to a stirred solution of (2-hydroxyethyl)hydrazine (0.3 mole) in 25 ml. of methanol. The mixture is stirred and refluxed for 1 hr. and is then cooled to about 0° C. The solid phase is separated by filtration, washed with methanol, and dried. The product thus obtained is oxalic acid bis[2-(2-hydroxyethyl)hydroazide].

EXAMPLE 9

*Preparation of oxalic acid bis[2-(3-hydroxypropyl)-hydrazide]*

Following the procedure of Example 8, but substituting (3-hydroxypropyl)hydrazine for (2-hydroxyethyl)hydrazine, oxalic acid bis[2-(3-hydroxypropyl)hydrazide] is obtained.

EXAMPLE 10

*Preparation of oxalic acid bis[2-(2-hydroxypropyl)-hydrazide]*

Following the procedure of Example 8, but substituting (2-hydroxypropyl)hydrazine for (2-hydroxyethyl)hydrazine, oxalic acid bis[2-(2-hydroxypropyl)hydrazide] is obtained.

EXAMPLE 11

*Preparation of oxalic acid bis[2-(2-hydroxy-1-methylethyl)-hydrazide]*

Following the procedure of Example 8, but substituting (2-hydroxy-1-methylethyl)hydrazine for (2-hydroxyethyl)hydrazine, there is obtained oxalic acid bis[2-(2-hydroxy-1-methylethyl)hydrazide], identical with the product of Example 3.

EXAMPLE 12

*Preparation of oxalic acid bis[2-(2,3-dihydroxypropyl)hydrazide]*

Following the procedure of Example 8 but substituting (2,3-dihydroxypropyl)hydrazine for (2-hydroxyethyl)-hydrazine, oxalic acid bis[2-(2,3-dihydroxypropyl)hydrazide] is obtained.

EXAMPLE 13

*Preparation of oxalic acid bis[2-(4-hydroxybutyl)-hydrazide]*

Following the procedure of Example 8, but substituting (4-hydroxybutyl)hydrazine for (2-hydroxyethyl)hydrazine, oxalic acid bis[2-(4-hydroxybutyl)hydrazide] is obtained.

EXAMPLE 14

*Preparation of oxalic acid bis[2-(2-hydroxybutyl)-hydrazide]*

Following the procedure of Example 8, but substituting (2-hydroxybutyl)hydrazine for (2-hydroxyethyl)hydrazine, oxalic acid bis[2-(2-hydroxybutyl)hydrazide] is obtained.

EXAMPLE 15

*Preparation of oxalic acid bis[2-(2-hydroxy-1-methylpropyl)hydrazide]*

Following the procedure of Example 8, but substituting (2-hydroxy-1-methylpropyl)hydrazine for (2-hydroxyethyl)hydrazine, there is obtained oxalic acid bis[2-(2-hydroxy-1-methylpropyl)hydrazide], identical with the product of Example 1.

EXAMPLE 16

*Preparation of oxalic acid bis[2-(2-hydroxy-2-methylbutyl)hydrazide]*

Following the procedure of Example 8, but substituting (2-hydroxy-2-methylbutyl)hydrazine for (2-hydroxyethyl)hydrazine, oxalic acid bis[2-(2-hydroxy-2-methylbutyl)hydrazide] is obtained.

EXAMPLE 17

*Preparation of oxalic acid bis[2-(2-hydroxyhexyl)-hydrazide]*

Following the procedure of Example 8, but substituting (2-hydroxyhexyl)hydrazine for (2-hydroxyethyl)hydrazine, oxalic acid bis[2-(2-hydroxyhexyl)hydrazide] is obtained.

EXAMPLE 18

*Preparation of oxalic acid bis{2-[1-(hydroxymethyl)pentyl]hydrazide}*

Following the procedure of Example 8, but substituting [1-(hydroxymethyl)pentyl]hydrazine for (2-hydroxyethyl)hydrazine, oxalic acid bis{2-[1-hydroxymethyl)-pentyl]hydrazide} is obtained.

EXAMPLE 19

*Preparation of oxalic acid 2-(2-hydroxyethyl)hydrazide 2-methylhydrazide*

A. MONOMETHYL OXALATE 2-METHYLHYDRAZIDE

A solution of methylhydrazine (0.1 mole) in 12.5 ml. of methanol is added during 1 hr. to a stirred solution of dimethyl oxalate (0.1 mole) in 125 ml. of methanol, the mixture being maintained at about −15° C. The mixture is stirred for an additional 15 min. at the same temperature and then for 2 hr. at about 25° C. The mixture is filtered and concentrated until crystallization commences. When crystallization is complete, the desired monomethyl oxalate 2-methylhydrazide is recovered by filtration.

B. OXALIC ACID 2-(2-HYDROXYETHYL)HYDRAZIDE 2-METHYLHYDRAZIDE

A solution of monomethyl oxalate 2-methylhydrazide (0.1 mole) in 25 ml. of methanol is gradually added to a stirred solution of (2-hydroxyethyl)hydrazine (0.15 mole) in 25 ml. of methanol. The mixture is stirred and refluxed for 1 hr. and is then cooled to about 0° C. The desired oxalic acid 2-(2-hydroxyethyl)hydrazide 2-methylhydrazide is recovered by filtration.

EXAMPLE 20

*Preparation of oxalic acid 2-(3-hydroxypropyl)-hydrazide 2-(4-hydroxybutyl)hydrazide*

Following the procedure of Example 19, Part A, but substituting (3-hydroxypropyl)hydrazine) for methylhydrazine, monomethyl oxalate 2-(3-hydroxypropyl)hydrazide is obtained, which is then reacted with (4-hydroxybutyl)hydrazine according to the procedure of Part B to obtain the desired oxalic acid 2-(3-hydroxypropyl)hydrazide 2-(4-hydroxybutyl)hydrazide.

I claim:
1. Compound having the following structural formula

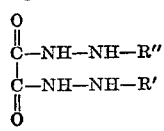

wherein R' is hydroxyalkyl of from 2 to 6 carbon atoms, inclusive, and R" is selected from the group consisting of hydroxyalkyl of from 2 to 6 carbon atoms, inclusive, and alkyl of from 1 to 6 carbon atoms, inclusive.

2. Compound according to claim 1 wherein R" is hydroxyalkyl.
3. Oxalic acid bis[2-(2-hydroxy-1-methylpropyl)hydrazide].
4. Oxalic acid bis{2-[2-hydroxy-1-(hydroxymethyl)-ethyl]hydrazide}.
5. Compound according to claim 1 wherein R" is alkyl.
6. Oxalic acid 2-[2-hydroxy-1-(hydroxymethyl)ethyl]-hydrazide 2-isopropylhydrazide.

References Cited in the file of this patent
UNITED STATES PATENTS

| | | |
|---|---|---|
| 2,835,703 | Caldwell et al. | May 20, 1958 |
| 2,928,875 | Martin et al. | Mar. 15, 1960 |

OTHER REFERENCES

DeGraff: Chemical Abstracts, vol. 24, pages 5723–24 (1930).

Sah et. al.: Chemical Abstracts, vol. 43, pages 6971–72 (1949).

Yale et al.: Jour. Amer. Chem. Soc., vol. 75, page 1933 (1953).